United States Patent
Nguyen

(10) Patent No.: US 8,103,738 B2
(45) Date of Patent: Jan. 24, 2012

(54) MICRO-CLIENT FOR INTERNET APPLIANCE

(76) Inventor: Julien T. Nguyen, Saratoga, CA (US)

( * ) Notice: Subject to any disclaimer, the term of this patent is extended or adjusted under 35 U.S.C. 154(b) by 1267 days.

(21) Appl. No.: 11/512,793

(22) Filed: Aug. 30, 2006

(65) Prior Publication Data
US 2006/0288084 A1 Dec. 21, 2006

Related U.S. Application Data

(63) Continuation of application No. 10/418,951, filed on Apr. 18, 2003, now Pat. No. 7,325,077, which is a continuation of application No. 08/918,096, filed on Aug. 21, 1997, now Pat. No. 6,564,250.

(51) Int. Cl.
G06F 15/16 (2006.01)
(52) U.S. Cl. ........ 709/217; 709/246; 709/201; 709/203; 715/205
(58) Field of Classification Search ........... 709/217.246, 709/201, 203; 715/205
See application file for complete search history.

(56) References Cited

U.S. PATENT DOCUMENTS

| | | |
|---|---|---|
| 5,204,947 A | 4/1993 | Bernstein et al. |
| 5,377,354 A | 12/1994 | Scannell |
| 5,499,109 A | 3/1996 | Mathur |
| 5,508,817 A | 4/1996 | Kunigami |
| 5,513,126 A | 4/1996 | Harkins |
| 5,548,789 A | 8/1996 | Nakanura |
| 5,572,643 A | 11/1996 | Judson |
| 5,574,843 A | 11/1996 | Gerlach, Jr. |
| 5,619,648 A | 4/1997 | Canale et al. |
| 5,623,603 A | 4/1997 | Jiang et al. |
| 5,627,764 A | 5/1997 | Schutzman |
| 5,630,060 A | 5/1997 | Tang et al. |
| 5,652,749 A | 7/1997 | Davenport et al. |
| 5,666,542 A | 9/1997 | Yamazaki Mitsuyoshi et al. |
| 5,673,316 A | 9/1997 | Auerbach et al. |
| 5,675,507 A | 10/1997 | Bobo, II |
| 5,680,619 A | 10/1997 | Gudmundson |
| 5,694,163 A | 12/1997 | Harrison |
| 5,706,502 A | 1/1998 | Foley et al. |

(Continued)

FOREIGN PATENT DOCUMENTS
WO WO 99/50744 10/1999

OTHER PUBLICATIONS

"Advisory Action", U.S. Appl. No. 10/446,623, (Mar. 19, 2009), 3 pages.

(Continued)

*Primary Examiner* — Kyung-Hye Shin

(57) ABSTRACT

The invention provides a method and system for providing features for internet access at an internet appliance which go beyond the resource limitations of the internet appliance. The desired features are primarily implemented on the server, and coupled to the internet appliance for display, responsive to the ability of the internet appliance to provide those features. (1) The internet appliance and the server adapt to communication link limitations by dynamically adjusting picture quality or size for graphics to be displayed. (2) The internet appliance and the server adapt to memory and processor limitations by dynamically running applets at the server and intercepting display functions of applets for display at the internet appliance. (3) The internet appliance and the server adapt to memory and processor limitations by dynamically running editing programs or web pages at the server and by dynamically adjusting picture quality or size for graphics to be displayed.

41 Claims, 1 Drawing Sheet

U.S. PATENT DOCUMENTS

| | | | |
|---|---|---|---|
| 5,710,883 | A | 1/1998 | Hong et al. |
| 5,724,574 | A | 3/1998 | Stratigos |
| 5,727,159 | A | 3/1998 | Kikinis |
| 5,734,835 | A | 3/1998 | Selker |
| 5,737,599 | A | 4/1998 | Rowe et al. |
| 5,737,619 | A | 4/1998 | Judson |
| 5,742,768 | A | 4/1998 | Gennaro et al. |
| 5,754,765 | A | 5/1998 | Danneels et al. |
| 5,754,851 | A | 5/1998 | Wissner |
| 5,761,673 | A | 6/1998 | Bookman et al. |
| 5,764,235 | A | 6/1998 | Hunt et al. |
| 5,768,505 | A | 6/1998 | Gilchrist et al. |
| 5,781,741 | A | 7/1998 | Imamura |
| 5,781,785 | A | 7/1998 | Rowe et al. |
| 5,784,058 | A | 7/1998 | LaStrange et al. |
| 5,784,553 | A | 7/1998 | Kolawa et al. |
| 5,787,175 | A | 7/1998 | Carter |
| 5,787,470 | A | 7/1998 | DeSimone et al. |
| 5,794,039 | A | 8/1998 | Guck |
| 5,794,259 | A | 8/1998 | Kikinis |
| 5,802,530 | A | 9/1998 | Van Hoff |
| 5,805,829 | A | 9/1998 | Cohen et al. |
| 5,809,512 | A | 9/1998 | Kato |
| 5,818,435 | A | 10/1998 | Kozuka |
| 5,818,447 | A | 10/1998 | Wolf et al. |
| 5,826,102 | A | 10/1998 | Escobar |
| 5,828,839 | A | 10/1998 | Moncreiff |
| 5,835,683 | A | 11/1998 | Corella et al. |
| 5,842,020 | A | 11/1998 | Faustini |
| 5,845,299 | A | 12/1998 | Arora et al. |
| 5,848,415 | A | 12/1998 | Guck |
| 5,850,446 | A | 12/1998 | Berger et al. |
| 5,854,893 | A | 12/1998 | Ludwig et al. |
| 5,862,260 | A | 1/1999 | Rhoads |
| 5,870,544 | A | 2/1999 | Curtis |
| 5,872,915 | A | 2/1999 | Dykes et al. |
| 5,875,322 | A | 2/1999 | House et al. |
| 5,878,223 | A | 3/1999 | Becker et al. |
| 5,889,942 | A | 3/1999 | Orenshteyn |
| 5,890,129 | A | 3/1999 | Spurgeon |
| 5,909,545 | A | 6/1999 | Frese et al. |
| 5,911,776 | A | 6/1999 | Guck |
| 5,918,012 | A | 6/1999 | Astiz et al. |
| 5,918,013 | A | 6/1999 | Mighdoll et al. |
| 5,937,160 | A * | 8/1999 | Davis et al. .............. 709/203 |
| 5,956,491 | A | 9/1999 | Marks |
| 5,956,701 | A | 9/1999 | Habermehl |
| 5,963,217 | A | 10/1999 | Grayson |
| 5,995,093 | A | 11/1999 | Lambourne |
| 6,008,836 | A | 12/1999 | Bruck et al. |
| 6,014,688 | A | 1/2000 | Venkatraman |
| 6,029,164 | A | 2/2000 | Birrell et al. |
| 6,032,150 | A | 2/2000 | Nguyen |
| 6,185,625 | B1 | 2/2001 | Tso et al. |
| 6,233,600 | B1 * | 5/2001 | Salas et al. .............. 709/201 |
| 6,285,889 | B1 * | 9/2001 | Nykanen et al. .......... 455/557 |
| 6,343,302 | B1 * | 1/2002 | Graham ................... 715/205 |
| 6,564,250 | B1 | 5/2003 | Nguyen |
| 7,647,550 | B1 | 1/2010 | Nguyen |
| 2009/0327522 | A1 | 12/2009 | Nguyen |
| 2010/0115388 | A1 | 5/2010 | Nguyen |

OTHER PUBLICATIONS

"Non Final Office Action", U.S. Appl. No. 10/446 623, (Apr. 16, 2009), 26 pages.

"Non Final Office Action", U.S. Appl. No. 11/513,584. (Jun. 25, 2010), 24 pages.

Bolot, et al., "Scalable Feedback Control for Multicast Video Distribution in the Internet," SIGCOMM 94, pp. 58-67.

Fox, et al., "Adapting to Network and Client Variability via On-Demand Dynamic Transcoding," 1996, http://citeseer.ist.psu.edu/fox96adapting.html.

Fox, et al., "Reducing WWW Latency and Bandwidth Requirements by Real-Time Distillation," May 1996, Computer Networks and ISDN Systems, vol. 28, Issues 7-11, pp. 1445, http://citeseer.ist.psu.edu/fox96reducing.html.

Brooks, et al., "Application-Specific Proxy Servers at HTTP Stream Transducers," Dec. 1995, Wold Wide Web Journal, pp. 539-548.

Shimada, et al., "Interactive Scaling Control Mechanism for World-Wide Web Systems," Computer Networks and ISDN Systems, vol. 29, Issues 8-13, Sep. 1997, pp. 1467-1477.

Blumfield, Julie R., et al. "Step-by-Step to a World-Class Web Site," Windows Magazine, Jul. 1995, vol. 6, No. 8.

Brown, March H. and Robert A Shillner, "A New Paradigm for Browsing the Web," Mar. 7-11, 1995.

Graham, Malcom & Andrew Surray, "Webbed Documents," pp. 58-62, Oct. 1995.

Using Netscape 2-special Edition.

Chung-Ming Huang, et al., "Multimedia E-Mail: The Evolution Approach Based on Adapters," Software Practice & Experience, vol. 24, No. 9, Sep. 1, 1994, pp. 785-900, Xpooo655471 ISSN: 0038-0644, pp. 794, line 2; Figures 11, 12.

Ouhyoung M et al., "The MOS Multimedia E-Mail System," Proceedings of the International Conference on Multimedia Computing and Systems, May 19, 1994, pp. 315-324, XP002073636, p. 315, right-hand column, line 21-p. 319, left-hand column, line 3; figures 1, 2; table 1.

"Non Final Office Action", U.S. Appl. No. 12/552,188, (Sep. 30, 2010), 19 pages.

"Notice of Allowance/Base Issue Fee", U.S. Appl. No. 10/446,623, (Sep. 4, 2009), 7 pages.

Tessier, Tom, "Using JavaScript to Create Interactive Web Pages," Dr. Dobb's Journal on CD-ROM, Jan. 1996.

Brown, Mark et al., "Using Netscape 2-special Edition", Jan. 1995.

Davis, Stephen R., "Teach Yourself Java Programming the Quick and Easy Way with Microsoft Visual: Learn Java Now," Microsoft Press 3 0402 00136 8093, Jan. 1996.

Anonymous, "Graphical Command Line," IBM Technical Disclosure Bulletin, vol. 32, No. 8B, pp. 313-314, XP002109975, New York, US, Jan. 1990.

Anonymous, "Editing Word Processor Documents," IBM Technical Disclosure Bulletin, vol. 40, No. 7, pp. 187-188, XP002109976, New York, US, Jul. 1997.

Brown, Mark et al., "Using Netscape 2," pp. 327-375, Jan. 1995.

* cited by examiner

MICRO-CLIENT FOR INTERNET APPLIANCE

This application is a continuation of U.S. patent application Ser. No. 10/418,951, filed on Apr. 18, 2003 now U.S. Pat. No. 7,325,077, which is a continuation of U.S. patent application Ser. No. 08/918,096, filed on Aug. 21, 1997, now U.S. Pat. No. 6,564,250.

BACKGROUND OF THE INVENTION

1. Field of the Invention

The invention relates to internet appliances.

2. Related Art

An "internet appliance" is a relatively inexpensive, relatively low powered processor which is capable of connection to a network of computers, the largest of which is commonly known as the "internet" (but such networks may be independent networks or may be part of a private network commonly known as an "intranet"). An internet appliance is typically designed to provide access to services available using the internet, including electronic mail and access to the world wide web. An internet appliance provides such access using client software which interfaces to server software on another, relatively more powerful, processor which a more direct connection to the internet.

One problem which has arisen in the art is that resource limitations of the internet appliance limit the capability of the internet appliance to provide features in the client software. For a first example, communication link or memory limitations of the internet appliance can limit the ability of the internet appliance to provide quality graphics display. For a second example, memory or processor limitations of the internet appliance can cause the internet appliance to be unable to run applets using Java (or using other applet languages such as ActiveX), or to be unable to provide editing features for graphics or other web page features.

Accordingly, it would be desirable to provide a method and system for providing features for internet access at an internet appliance, notwithstanding resource limitations at the internet appliance. This advantage is achieved in an embodiment of the invention in which desired features are primarily implemented on the server, and coupled to the internet appliance for display, responsive to the ability of the internet appliance to provide those features.

SUMMARY OF INVENTION

The invention provides a method and system for providing features for internet access at an internet appliance which go beyond the resource limitations of the internet appliance. The desired features are primarily implemented on the server, and coupled to the internet appliance for display, responsive to the ability of the internet appliance to provide those features. In particular embodiments, (1) the internet appliance and the server adapt to communication link limitations by dynamically adjusting picture quality or size for graphics to be displayed; (2) the internet appliance and the server adapt to memory and processor limitations by dynamically running applets at the server and intercepting display functions of applets for display at the interne appliance; (3) the internet appliance and the server adapt to memory and processor limitations by dynamically running editing programs or web pages at the server and by dynamically adjusting picture quality or size for graphics to be displayed.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

application Ser. No. 08/918,698, filed Aug. 21, 1997, in the name of the same inventor, titled "Active Electronic Mail"; and application Ser. No. 08/918,094, filed Aug. 21, 1997, in the name of the same inventor, titled "Secure Graphical Objects in Web Documents".

Each of these applications is hereby incorporated by reference as if fully set forth herein.

Miniclient and Server

Figure 1:
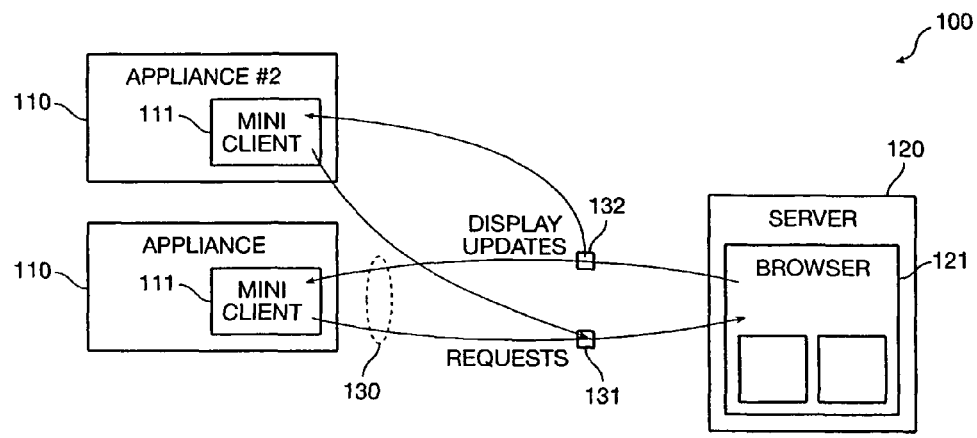
FIG. 1 shows a block diagram of a system including an internet appliance and a server, in use for displaying graphics.

FIG. 1 shows a block diagram of a system including an internet appliance to and a server, in use for displaying graphics.

In a system 100 including an internet appliance 110 and a server 120, the internet appliance 110 includes a miniclient 111, while the server 120 includes a full web browser 121.

The miniclient 111 comprises a web client which has been stripped down; it uses only the relatively limited resources of the internet appliance 110 (such as relatively limited memory or processing capability), and consequently has only relatively limited capability. The miniclient 111 is capable of transmitting web requests entered by a user, capable of displaying web pages, in a manner described herein, and capable of other functions described herein.

The web browser 121 comprises a full-featured web client which is able to take advantage of the relatively greater resources of the server 120 (such as relatively greater memory or processing capability), and consequently has capabilities found in web clients which are designed for full-featured computers. In a preferred embodiment, the web browser 121 might have features such as found in Microsoft Corporation's "Internet Explorer" product or Netscape Corporation's "Netscape Navigator" product.

For example, these features might include transmitting web requests entered by the user and transmitted from the interne appliance 110 to the server 120, preparing web pages for display by the miniclient 111 at the internet appliance 110, caching web pages and other web objects for use by the miniclient 111 at the internet appliance 110, and running applets embedded in web pages.

As used herein, the term "web" as used in the phrases "web client", "web page", and the like, refers to information transfer using the hypertext transmission protocol (HTTP), and extensions and variants thereof. The reader is cautioned that HTTP is a rapidly evolving protocol, with many variants and many extensions, modifications, and variants thereof, both official and unofficial. Some of these extensions, modifications, and variants include those which have security features, those which are particular to certain languages or character sets, those which are particular to certain display features, and so on. Not all web browsers are compatible with all extensions, modifications, and variants of HTTP, and it is expected both that further extensions, modifications, and variants of HTTP will continue to develop, and that this lack of industry-wide compatibility will continue for the near future.

Those skilled in the art would be aware, after perusing this application, that the invention is applicable to all such extensions, modifications, and variants of HTTP, without undue experimentation or further invention, and that the scope and spirit of the invention is broad enough to encompass all such applications.

The miniclient 111 and the web browser 121 are coupled by a communication link 130. The miniclient 111 transmits a set of web requests 131 to the web browser 121 on the communication link 130. The web browser 121 receives the web requests 131 and (if they are not already in a dialect of HTTP) transforms them into proper HTTP protocol requests and transmits them to a web server (not shown). The web server serves up web pages and other web objects to the web browser 121, which caches them and prepares them for display by the miniclient. The web browser 121 transmits a set of display updates 132 to the miniclient 111 on the communication link 130. The miniclient 111 receives the display updates 132 and updates its display for presentation to the user.

Displaying Graphics

In a preferred embodiment, the communication link 130 includes a cellular telephone communication circuit or other radiotelephone communication circuit. In alternative embodiments, the communication link 130 includes other communication elements, such as other telephone communication circuits, frame relay or packet radio communication circuits, or other known methods of communication.

The communication link 130 might accordingly be a limited resource, either by bandwidth (because of the quality of the communication circuit), by expense (because of the cost of maintaining the communication circuit), or by availability (because of the physical difficulty of maintaining the communication circuit). For example, in the case the communication link 130 includes a cellular telephone communication circuit or other radiotelephone communication circuit, each minute of communication is relatively expensive, has only limited bandwidth, and may also be subject to periods of unavailability due to the radio transmission environment.

When transmitting the display updates 132, the web browser 121 adjusts a measure of relative quality of the web page to be displayed (or a graphic element therein) in response to the relative quality of the communication link 130. The measure of relative quality might include the relative coarseness or fineness of the graphic element, the relative size of the graphic element, the relative color density of the graphic element, the relative lossiness of compression of the graphic element, or other measures of quality of the graphic element.

In a preferred embodiment, any adjustment to the relative quality of the web page to be displayed can also be made with regard to one or more graphic elements, such as pictures, to be displayed with the web page. Similarly, any adjustment to the relative quality of the web page to be displayed can also be made with regard to text to be displayed with the web page, either by compressing the text or by serving only that text which fits within a display window for the miniclient 111.

In a preferred embodiment, the web browser 121 dynamically measures the relative quality of the communication link 130, such as the bandwidth available using the communication link 130, the cost of using the communication link 130, the bit error rate or other availability measure for the communication link 130, or other measures of relative quality of the communication link 130.

Upon dynamically measuring the relative quality of the communication link 130, the web browser 121 adjusts the display updates 132 to account for that dynamic measure. In a preferred embodiment, the web browser 121 dynamically adjusts the relative quality of the web page (or the graphic element therein) for display, so as to maintain relatively constant a measure of resource usage at the miniclient 111. For example, the measure of resource usage might be the amount of time taken to serve the web page to the miniclient 111 or the monetary cost associated with serving the web page to the miniclient 111.

In alternative embodiments, the miniclient 111 informs the web browser 121 of a display resolution or a display size which is available at the miniclient 111 for web pages, and the web browser 121 adjusts the relative quality of the web page (or the graphic element therein) for display, so as to match the display to the display capability of the miniclient 111. For example, the web browser 121 can adjust the display size of a graphic element so that the graphic element can be displayed at the miniclient 111 without any requirement for scrolling.

The miniclient 111 also has one or more additional commands by which the user can instruct the web browser 121 to adjust the measure of relative quality of the web page for display (or of the graphic element therein) to a selected relatively constant value, or to a selected value associated with a selected relatively constant measure of resource usage at the miniclient 111. Thus, for example, the user can instruct the web browser 121 to display graphic elements at the miniclient 111 at a selected resolution, or can instruct the web browser 121 to display graphic elements at the miniclient 111 so that each web page is served in no more than 50 seconds of cellular air time.

In a preferred embodiment, the miniclient 111 also has one or more additional commands by which the user can also instruct the web browser 121 to continue serving progressive information about the graphic element even after the graphic element is ready for display at the miniclient 111, so that the user can, for example, enter a command (such as a control key or a mouse click), to obtain a relatively better quality or relatively larger size graphic element, or further text which otherwise would not be displayed. In alternative embodiments, the continued serving of progressive information about the graphic element can occur even after the user has spent substantial time reviewing the graphic element.

In a preferred embodiment, a second internet appliance 110 with a second miniclient 111 can duplicate the display of the first miniclient 111 by receiving the display updates 132 and presenting a display which is identical to the first miniclient 111. In alternative embodiments, the second miniclient 111 can also transmit web requests 131 using the communication link 130 (where the communication link 130 is susceptible to such common usage), so that either miniclient 111 can affect the display of the other miniclient 111.

Running Applets

Figure 2:
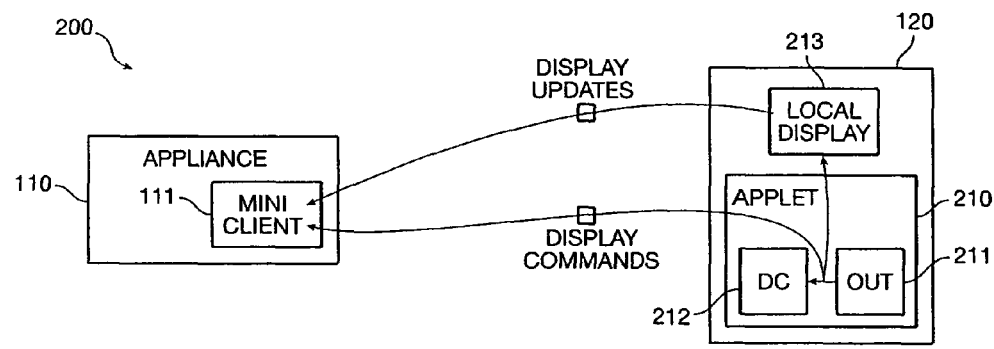
FIG. 2 shows a block diagram of a system including an internet appliance and a server, in use for running applets.

FIG. 2 shows a block diagram of a system including an internet appliance and a server, in use for running applets.

In a system 200 including an internet appliance 110 and a server 120, the internet appliance 110 includes a miniclient 111, while the server 120 includes an applet 210.

Because the miniclient 111 has no Java capability or only relatively limited Java capability, it is desirable to execute the applet 210 on the server 120. The applet 210 includes a set of advanced window tools 211 and a set of display classes 212.

In normal operation, the applet 210 provides a local display 213 for the server 120, which if the server 120 were local to the user, would be displayed to the user.

The server 120 dynamically receives the applet 210, such as from a web page which it has accessed at the request of the miniclient 111 (at the behest of the user), and dynamically executes the applet 210 at the server 120. One of two alternative embodiments is preferred.

First, the server 120 may generate the local display 213 and transmit display updates 132 to the miniclient 111 in response thereto.

Second, the server 120 may intercept calls made by the applet 210 from the advanced window tools 211 to the set of display classes 212, and transmit those calls as display commands to the miniclient 111 for execution at the miniclient 111.

In either embodiment, the miniclient 111 is not required to execute or interpret Java code, and is able to display the results of the executing applet 210 as if the applet 210 were actually executing at the miniclient 111.

Editing Applets or Web Pages

Figure 3:
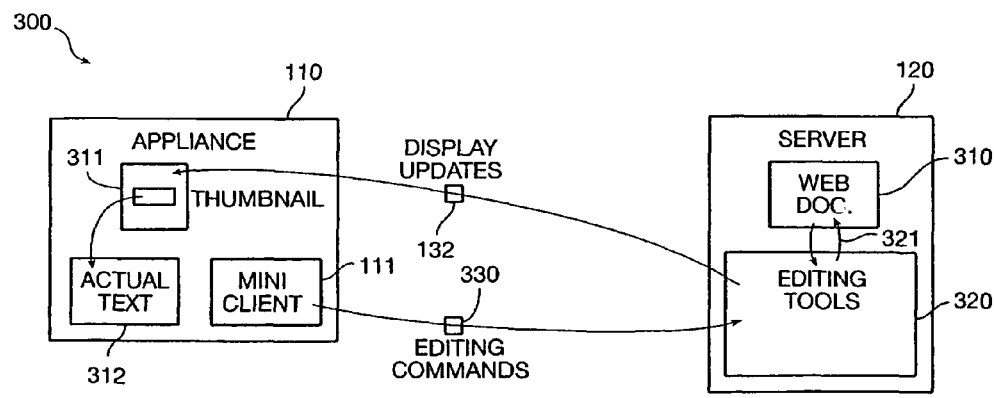
FIG. 3 shows a block diagram of a system including an internet appliance and a server, in use for editing applets or web pages.

FIG. 3 shows a block diagram of a system including an internet appliance and a server, in use for editing applets or web pages.

In a system 300 including an internet appliance 110 and a server 120, the internet appliance 110 includes a miniclient 111, while the server 120 includes web document 310 or other web object.

Because the miniclient 111 has relatively limited memory, it is desirable to maintain the web document 310 and editing tools 320 on the server 120. The miniclient 111 receives editing commands 330 from the user and transmits those editing commands 330 to the server 120.

The server 120 receives the editing commands 330 and passes them to the editing tools 320, which edit the web document 310 at the server 120. The server 120 receives the HTML updates 321 and updates the web document 310, including updating any applets, graphical elements or references to other web objects.

The server 120 dynamically generates a reduced-size ("thumbnail") graphic display 311 of the web document 310, and transmits display updates 132 for the thumbnail graphic display 311 to the miniclient 111. The miniclient 111 dynamically displays the thumbnail graphic display 311 so the user can review changes to the web document 310 as they are made. The server 120 dynamically adjusts quality and size of the thumbnail graphic display 311 as described herein.

Where the web document 310 includes actual text 312, the miniclient 111 receives the actual text 312 from the server 120 and displays the actual text 312 in a separate display window for the user.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A server, comprising a processor, a memory, and one or more editing tools, wherein the server is configured to:
   receive one or more editing commands from a client to be applied to a web object;
   invoke at least one of the editing tools to apply the one or more editing commands to the web object to form an updated version of the web object; and
   form a transmission that includes a reduced-size representation of the updated version of the web object, wherein the reduced-size representation is dynamically displayable to show changes to the web object as the one or more editing commands are being applied to the web object.

2. The server of claim 1, wherein the transmission further includes one or more display updates to the client.

3. The server of claim 1, wherein the web object includes a web document.

4. The server of claim 3, wherein the web document includes a reference to another web document.

5. The server of claim 1, wherein the web object includes a graphical element.

6. The server of claim 1, wherein the web object includes an applet.

7. The server of claim 1, wherein the transmission includes a quality measure that is based on a transmission measure for a communication link between the server and the client.

8. The server of claim 7, wherein the server is further configured to individually and dynamically adjust the quality measure responsive to the transmission measure.

9. The server of claim 7, wherein the transmission measure is a bit transmission rate.

10. The server of claim 7, wherein the quality measure is a measure of webpage picture quality.

11. The server of claim 7, wherein the quality measure is a measure of picture quality.

12. A server, comprising:
   a processor;
   a memory;
   a web object;
   an editing means coupled to receive one or more editing commands from a client, the editing means for applying the one or more editing commands to the web object to form an updated version of the web object applet; and
   a transmission means for transmitting a reduced-size representation of the updated version of the web object, wherein the reduced-size representation is dynamically displayable to show changes to the web object as the one or more editing commands are being applied to the web object.

13. A device comprising processing capabilities and software that is stored in memory and executable using the processing capabilities to:
   accept user input comprising one or more editing commands;
   form a first transmission that includes the one or more editing commands to be transmitted to a server and to be applied to a web object at the server to form an updated version of the web object; and
   receive, from the server, a second transmission that includes a reduced-size representation of the updated version of the web object, wherein the reduced-size representation is dynamically displayable to show changes to the web object as the one or more editing commands are being applied to the web object.

14. The device of claim 13, wherein the web object includes an applet.

15. The device of claim 13, wherein the software is a miniclient.

16. The device of claim 13, wherein the device is a cell phone.

17. The device of claim 13, wherein the web object includes a web document.

18. The device of claim 17, wherein the web document includes a reference to another web document.

19. The device of claim 13, wherein the web object includes a graphical element.

20. A method comprising:
   receiving, at a server, one or more editing commands originated by a client to be applied to a web object;
   modifying the web object in the server responsive to the one or more editing commands using editing capabilities of the server to form an updated version of the web object; and
   transmitting a reduced-size representation of the updated version of the web object to the client, wherein the reduced-size representation is dynamically displayable to show changes to the web object as the one or more editing commands are being applied to the web object.

21. The method of claim 20, wherein the transmitting includes transmitting one or more display updates.

22. The method of claim 20, wherein the web object includes a web document.

23. The method of claim 22, wherein the web document includes a reference to another web document.

24. The method of claim 20, wherein the web object includes a graphical element.

25. The method of claim 20, wherein the web object includes an applet.

26. A method comprising:
   accepting user input, at a wireless phone, comprising one or more editing commands to modify a web object at a server;
   transmitting, by the wireless phone, the one or more editing commands to the server to effect the modification of the web object to form an updated version of the web object by using editing capabilities of the server; and
   receiving, from the server, a reduced-size representation of the updated version of the web object at the wireless phone, wherein the reduced-size representation is dynamically displayable to show changes to the web object as the one or more editing commands are being applied to the web object.

27. The method of claim 26, wherein the web object includes an applet.

28. The method of claim 26, wherein the web object includes a web document.

29. The method of claim 28, wherein the web document includes a reference to another web document.

30. The method of claim 26, wherein the web object webpage includes comprises a graphical element.

31. A non-transitory computer-readable medium having stores thereon a plurality of instructions that, responsive to execution by a server, cause the server to perform operations comprising:
   Receiving one or more editing commands from a client to be applied to a web object;
   Modifying the web object by applying the one or more editing commands to the web object to form an updated version of the web object by using editing capabilities of the server and
   Transmitting a reduced size representation of the updated version of the web object to the client, wherein the reduced-size representation is dynamically displayable to show changes to the web object as the one or more editing commands being applied to the web object.

32. The computer-accessible storage device of claim 31, wherein the transmitting includes transmitting one or more display updated for the client.

33. The computer-accessible storage device of claim 31, wherein the web object includes a web document.

34. The computer-accessible storage device of claim 33, wherein the web document includes a reference to another web document.

35. The computer-accessible storage device of claim 31, wherein the web object includes a graphical element.

36. The computer-accessible storage device of claim 31, wherein the web object includes an applet.

37. The computer-accessible storage device of claim 31, wherein the reduced-size representation includes a quality measure that is based on a transmission measure for a communication link between the server and the client.

38. The computer-accessible storage device of claim 37, wherein the instructions, when executed by the server, cause the server to perform further operations comprising:
   measuring the transmission measure; and
   adjusting the quality measure individually and dynamically responsive to the transmission measure.

39. The computer-accessible storage device of claim 38, wherein the transmission measure is a bit transmission rate.

40. The computer-accessible storage device of claim 38, wherein the quality measure is a measure of webpage display quality.

41. The computer-accessible storage device of claim 38, wherein the quality measure is a measure of picture quality.

\* \* \* \* \*

UNITED STATES PATENT AND TRADEMARK OFFICE
CERTIFICATE OF CORRECTION

| | | |
|---|---|---|
| PATENT NO. | : 8,103,738 B2 | |
| APPLICATION NO. | : 11/512793 | |
| DATED | : January 24, 2012 | |
| INVENTOR(S) | : Nguyen | |

It is certified that error appears in the above-identified patent and that said Letters Patent is hereby corrected as shown below:

Page 2, item (56), under "Other Publications", in Column 2, Line 1, delete "10/446 623," and insert -- 10/446,623, --.

Page 2, item (56), under "Other Publications", in Column 2, Line 3, delete "11/513,584." and insert -- 11/513,584, --.

Page 2, item (56), under "Other Publications", in Column 2, Line 15, delete "Wold" and insert -- World --.

Page 2, item (56), under "Other Publications", in Column 2, Lines 28-29, delete "Xpooo655471 ISSN: 0038-0644, pp. 794," and insert -- XP000655471 ISSN: 0038-0644, p. 794, --.

Column 1, line 3, below Title, insert -- CROSS-REFERENCE TO RELATED APPLICATIONS --.

Column 6, line 36, in Claim 12, delete "object applet;" and insert -- object; --.

Column 7, lines 45-46, in Claim 30, delete "object webpage includes comprises" and insert -- object comprises --.

Column 8, line 2, in Claim 31, delete "stores thereon" and insert -- stored thereon --.

Column 8, line 5, in Claim 31, delete "Receiving" and insert -- receiving --.

Column 8, line 7, in Claim 31, delete "Modifying" and insert -- modifying --.

Column 8, line 10, in Claim 31, delete "server and" and insert -- server; and --.

Column 8, line 11, in Claim 31, delete "Transmitting a reduced size" and insert -- transmitting a reduced-size --.

Signed and Sealed this
Fourteenth Day of August, 2012

David J. Kappos
*Director of the United States Patent and Trademark Office*

CERTIFICATE OF CORRECTION (continued)
U.S. Pat. No. 8,103,738 B2

Column 8, line 16, in Claim 32, delete "The computer-accessible storage device of claim 31," and insert -- The non-transitory computer-readable medium of claim 31, --.

Column 8, line 19, in Claim 33, delete "The computer-accessible storage device of claim 31," and insert -- The non-transitory computer-readable medium of claim 31, --.

Column 8, line 21, in Claim 34, delete "The computer-accessible storage device of claim 33," and insert -- The non-transitory computer-readable medium of claim 33, --.

Column 8, line 24, in Claim 35, delete "The computer-accessible storage device of claim 31," and insert -- The non-transitory computer-readable medium of claim 31, --.

Column 8, line 26, in Claim 36, delete "The computer-accessible storage device of claim 31," and insert -- The non-transitory computer-readable medium of claim 31, --.

Column 8, line 28, in Claim 37, delete "The computer-accessible storage device of claim 31," and insert -- The non-transitory computer-readable medium of claim 31, --.

Column 8, line 32, in Claim 38, delete "The computer-accessible storage device of claim 37," and insert -- The non-transitory computer-readable medium of claim 37, --.

Column 8, line 38, in Claim 39, delete "The computer-accessible storage device of claim 38," and insert -- The non-transitory computer-readable medium of claim 38, --.

Column 8, line 40, in Claim 40, delete "The computer-accessible storage device of claim 38," and insert -- The non-transitory computer-readable medium of claim 38, --.

Column 8, line 43, in Claim 41, delete "The computer-accessible storage device of claim 38," and insert -- The non-transitory computer-readable medium of claim 38, --.